United States Patent [19]
Forsyth

[11] Patent Number: 5,954,139
[45] Date of Patent: Sep. 21, 1999

[54] TILLAGE KNIFE WITH HYDRAULIC RESET APPARATUS

[76] Inventor: Daniel L. Forsyth, 630 Seventh St. S.E., Oelwein, Iowa 50662

[21] Appl. No.: 09/105,676

[22] Filed: Jun. 26, 1998

[51] Int. Cl.⁶ .................................................. A01B 61/04
[52] U.S. Cl. ........................................ 172/260.5; 172/263
[58] Field of Search ............................... 172/260.5, 261, 172/263

[56] References Cited

U.S. PATENT DOCUMENTS

| | | |
|---|---|---|
| 3,172,481 | 3/1965 | Trollsas . |
| 3,321,027 | 5/1967 | Johnson et al. . |
| 3,321,031 | 5/1967 | Evans . |
| 3,349,855 | 10/1967 | Knudson . |
| 3,416,611 | 12/1968 | Fischer . |
| 3,481,407 | 12/1969 | Arnold et al. . |
| 3,503,484 | 3/1970 | Oerman . |
| 3,536,141 | 10/1970 | Woelfel . |
| 3,543,862 | 12/1970 | Wenzel . |
| 3,565,180 | 2/1971 | Arnold et al. . |
| 3,589,448 | 6/1971 | Gay . |
| 3,599,728 | 8/1971 | Moe . |
| 3,605,905 | 9/1971 | Bo . |
| 3,642,074 | 2/1972 | Geurts . |
| 3,752,092 | 8/1973 | Vinyard . |
| 3,760,882 | 9/1973 | Geurts . |
| 3,901,326 | 8/1975 | Geurts . |
| 4,062,410 | 12/1977 | Moe . |
| 4,209,067 | 6/1980 | Poggemiller et al. . |
| 4,353,421 | 10/1982 | Lahti . |
| 4,353,423 | 10/1982 | Poggemiller . |
| 4,364,191 | 12/1982 | Cazes . |
| 4,422,511 | 12/1983 | Poggemiller . |
| 4,546,832 | 10/1985 | Dietrich, Sr. et al. . |
| 4,648,466 | 3/1987 | Baker et al. . |
| 4,660,652 | 4/1987 | Moos et al. . |
| 4,679,635 | 7/1987 | Fields . |

*Primary Examiner*—Christopher J. Novosad
*Attorney, Agent, or Firm*—Allan L. Harms

[57] ABSTRACT

Soil tillage apparatus with a hydraulic reset mechanism has a rigid vertical shank mounted to an elongate arm fixed below a lower plate which is pivotable upon an upper plate. The upper plate is adapted for mounting to an agricultural tool bar. A hydraulic cylinder is vertically mounted to the upper plate and is biased by pressurized hydraulic fluid to resist extension of the ram therefrom. The hydraulic cylinder is pivotal upon the upper plate and the ram is fixed by a pin to the elongate arm. A pressure reducing/relieving valve is adjustable to supply a fixed hydraulic fluid pressure to the hydraulic cylinder at all times.

15 Claims, 5 Drawing Sheets

TILLAGE KNIFE WITH HYDRAULIC RESET APPARATUS

BACKGROUND OF THE INVENTION

In crop-raising agriculture, efforts have been made to reduce the amount of tillage of crop land through "no-till" and "reduced till" farming practices. These efforts have led to the developments of tillage implements such as chisel plows and anhydrous ammonia applicator knives, which typically employ a curved shank on which a soil-engaging tooth is mounted. The curved shank is pivotally mounted to a base plate which is mounted to a horizontal tool bar which is drawn by a tractor. The curved shank of the tillage implement is biased in position upon the base plate by a coil spring in compression which resists the rearward movement of the tillage implement as it is drawn through the soil. When the tillage implement encounters an obstacle such as a rock, the tillage implement is forced rearward and upward against the resistance of the coil spring. As the tillage implement overcomes the obstacle, the coil spring forces the tillage implement back into position in the soil. As the tillage implement rises from the ground, the coil spring resists with increasing force and when a sufficiently large obstacle is encountered, the tillage implement may be displaced upwardly to a point at which the coil spring is fully compressed and it binds. In this condition, the coil spring is no longer acting as a biasing member but becomes a stop and this leads to bending of the base plate or the shank, or breakage of the soil engaging tooth on the lower end of the curved shank.

Efforts to reduce the potential of the coils to fully compress, such as by lengthening the spring have not been successful because the longer the coil spring, the greater its tendency to deform laterally, rather than to uniformly compress. Efforts to substitute the compression spring with an extension coil spring have not been successful due to the large static force needed to hold the tooth below the surface of the ground to be tilled as the tool bar is drawn across the ground.

When tilling rocky ground, it is common for prior art tillage implements to become damaged including through bending of the base plate or by breakage of the tooth. Repair is costly and time consuming. There is a need to improve the structure of tillage implements to provide a constant resistive force as the displacement of the tillage implement increases and to allow a greater range of displacement of the tillage implement, including sufficient displacement for the tooth of the tillage implement to rise from a soil depth of six inches to a height completely out of the soil and even above an outcropping rock. While existing coil spring biased tillage implements may permit a vertical displacement of the tillage implement's tooth of four inches, a larger range of displacement is desirable.

Previous devices which employ hydraulic cylinders to bias a plowshare in the soil include the devices illustrated in U.S. Pat. No. 3,481,407. The device of that patent employed a hydraulic cylinder with its ram extended to bias a plowshare into soil contact. A system pressure of 2200 psi was maintained to bias the plowshare but when an obstacle in the soil was encountered, system pressure could rise to 2800 psi whereupon the relief valve pressure was overcome and fluid was allowed to escape from the cylinder. With high pressure hydraulic fluid passing by a relief valve, heat is generated and extended overheating of the hydraulic system will result in premature system failure. Seed drills having a hydraulic reset feature are disclosed in U.S. Pat. No. 4,353,423 and 4,422,511 wherein a hydraulic cylinder with its ram normally in an extended position biases a gang of discs against the soil surface. When a soil obstacle is encountered, the disk gang is displaced upwardly causing the ram to retract and force hydraulic fluid through a relief valve. An extended ram being forced into the cylinder provides a point of instability in the system.

SUMMARY OF THE INVENTION

The present invention pertains to tillage implements for preparing soil for crop planting, injection of fertilizers, and chemicals and other disruption of the soil at a depth below the soil surface. The present invention includes a base plate which may be mounted below a horizontal tool bar. Below the base plate is pivotally mounted an elongate lever which is pivotable in a vertical plane aligned with the direction of travel. The elongate lever pivots along its length about a horizontal pin mounted to the underside of the base plate. The elongate lever has a rearward end fixed to a substantially vertical, rigid shank which depends from the rearward end of the lever. On the free end of the shank is mounted a tooth which encounters the soil to create a furrow therein.

A hydraulic cylinder is mounted vertically upon the base plate forward of its mounting to the tool bar. The hydraulic cylinder has a normally retracted ram, the free end of which extends from the cylinder through an opening in the base plate and is fixed to the forward end of the elongate lever. The hydraulic ram is biased into a retracted position by hydraulic fluid supplied from the tractor primary hydraulic system.

The hydraulic cylinder is connected to a pressure reducing/relieving valve which may be selectively adjusted by the user to control the hydraulic pressure at which hydraulic fluid may be exhausted from the exhaust port of the hydraulic cylinder. The valve permits hydraulic fluid to pass from the hydraulic pump of the tractor to the cylinder and allows hydraulic fluid above a preset pressure to be exhausted from the hydraulic cylinder to the hydraulic fluid reservoir of the tractor. By use of appropriate hydraulic fluid ducting, a gang of tillage implements employing the invention may be controlled through a single pressure reducing/relieving valve.

The invention provides a tillage knife which is urged into soil engaging position at a constant force, the invention continues to bias the tillage knife at the constant force after the knife has been deflected by its encounter of a buried rock or other obstacle. The deflection backward of the knife causes the ram of the cylinder to extend, forcing hydraulic fluid from the cylinder past the preset pressure reducing/relieving valve. The hydraulic fluid pressure presented to the hydraulic cylinder may be set at a level below the maximum primary circuit pressure of the tractor and once a soil obstacle is passed, the valve allows hydraulic fluid to be driven back to the cylinder, thereby causing the ram to retract and the knife to return to operation position in the soil.

By use of a secondary reduced pressure hydraulic circuit, the invention allows the hydraulic cylinder to exhaust hydraulic fluid as the ground engaging knife strikes an obstruction without increasing the knife point pressure to any great extent as the knife is driven backward. Further one pressure reducing/relieving valve may be used to control many of the invention reset apparatus by connecting the hydraulic cylinder of each apparatus in series.

It is therefore an object of the invention to provide a tillage implement which resists displacement from engagement with the soil by a constant force regardless of the extent of displacement of the tillage implement.

It is also an object of the invention to provide a tillage implement which may deflect a vertical distance of up to nine inches from its operative position in the soil being tilled.

It is further an object of the invention to provide a tillage implement which is less susceptible to damage when drawn through rocky soil.

It is a further object of the invention to provide a tillage implement which employs a solid shank to maintain a constant soil tillage depth under varying soil densities.

It is a further object of the invention to provide a tillage implement which does not cause forces on the knife point to increase as the implement trips over obstructions in the soil.

It is yet a further object of the invention to provide a tillage implement which may be employed with existing tool bar mounted hydraulic ducts.

It is yet another objection of the invention to provide a tillage implement which may be selectively adjusted for trip pressures in varying soil conditions.

These and other objects of the invention will be understood from examination of the detailed description which follows.

DESCRIPTION OF THE DRAWING FIGURES

FIG. 6 is a schematic representation of the hydraulic circuit of the invention.

DETAILED DESCRIPTION OF THE INVENTION

Figure 1:
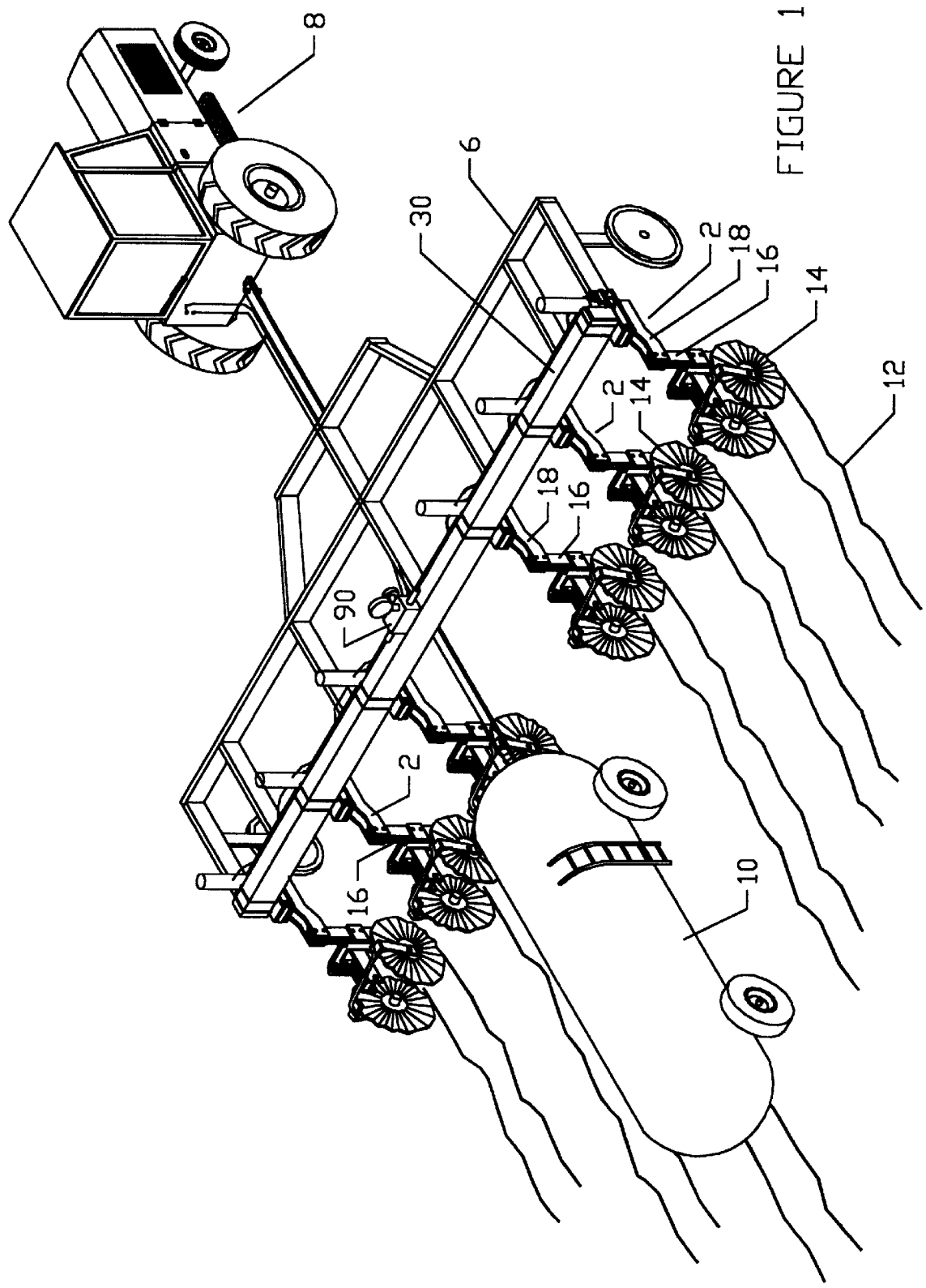
FIG. 1 is a perspective view of a tool bar equipped with several of the invention shown in use in application of anhydrous ammonia with each invention equipped with a furrow closing mechanism.
Figure 2:
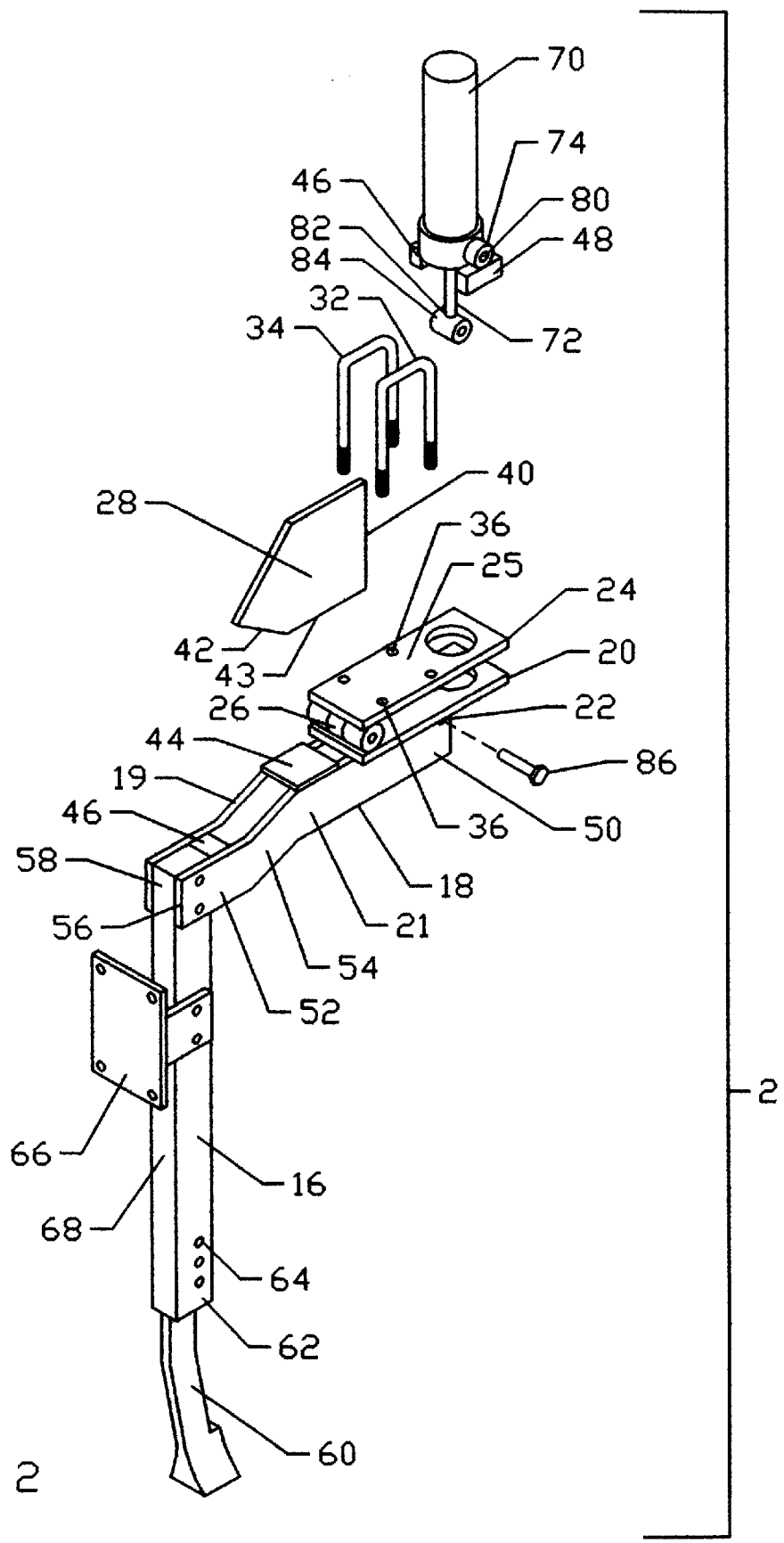
FIG. 2 is an exploded view in perspective of the preferred embodiment of the present invention.
Figure 3:
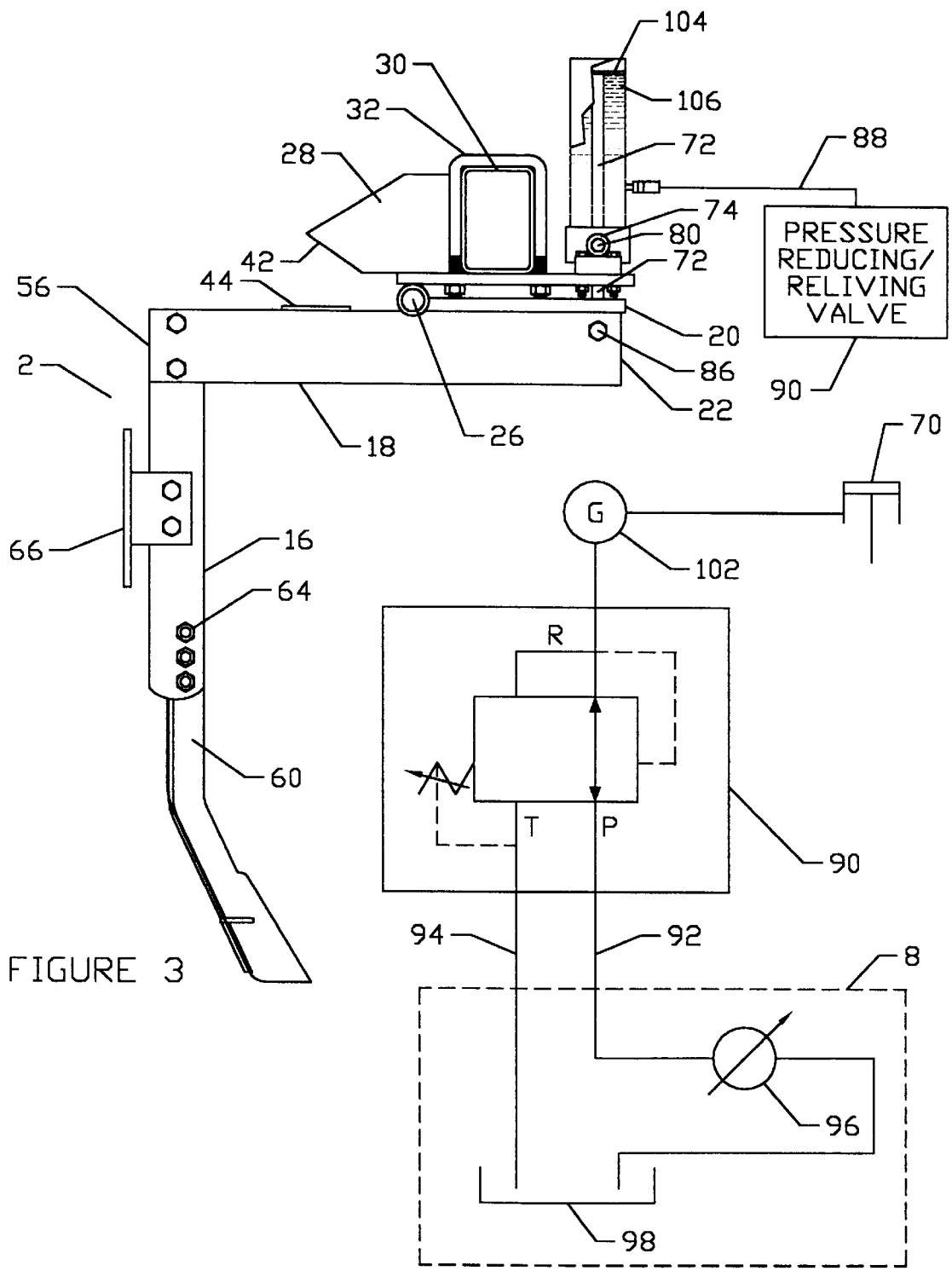
FIG. 3 is a front elevation of the preferred embodiment of the invention shown in its rest position with part of the cylinder cut away and showing a schematic representation of the hydraulic of the preferred embodiment.

FIG. 1 illustrates a typical tool bar 30 carried on a frame 6 which is towed by a tractor 8. A liquid tank 10 is drawn by the frame 6 allowing liquid fertilizer or other chemicals to be transferred by hoses or pipes for injection in the soil 12 over which the tool bar 30 is drawn. Six units of the invention 2 which are mounted to the tool bar. Each unit of invention 2 is provided with a furrow closer apparatus 14 mounted thereto, such that after a furrow or trench is opened by invention 2, furrow closer apparatus 14 will close and seal the furrow. Each invention 2 includes a substantially vertically oriented elongate shank 16 mounted to arm 18 which is secured to tool bar 4.

Referring now to FIGS. 2–6, details of the invention 2 may be seen. Invention 2 comprises an arm 18 which when invention 2 is in its working state is disposed substantially horizontally. Arm 18 is provided with opposing forward and rear ends, with forward end 22 having a first plate 20 secured thereabove by welding or other permanent means. First plate 20 is interconnected to mounting plate 24 by pin 26 which is substantially axially horizontal such that first plate 20 and arm 18 may rotate about pin 26 within a vertical plane.

Figure 4:
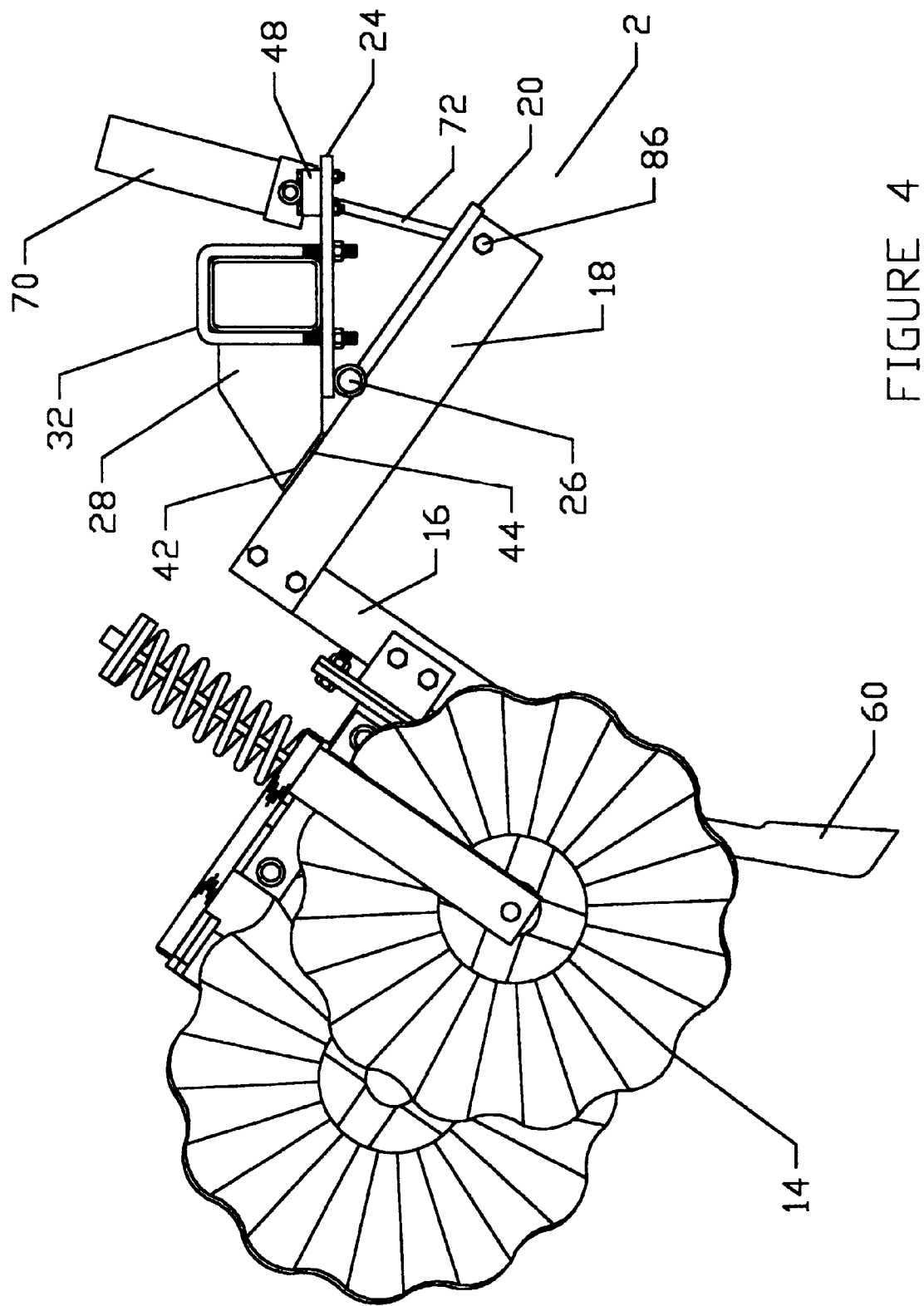
FIG. 4 is a front elevation of the preferred embodiment of the invention shown in its fully deflected state with furrow closer apparatus mounted to the rear of the invention.
Figure 5:
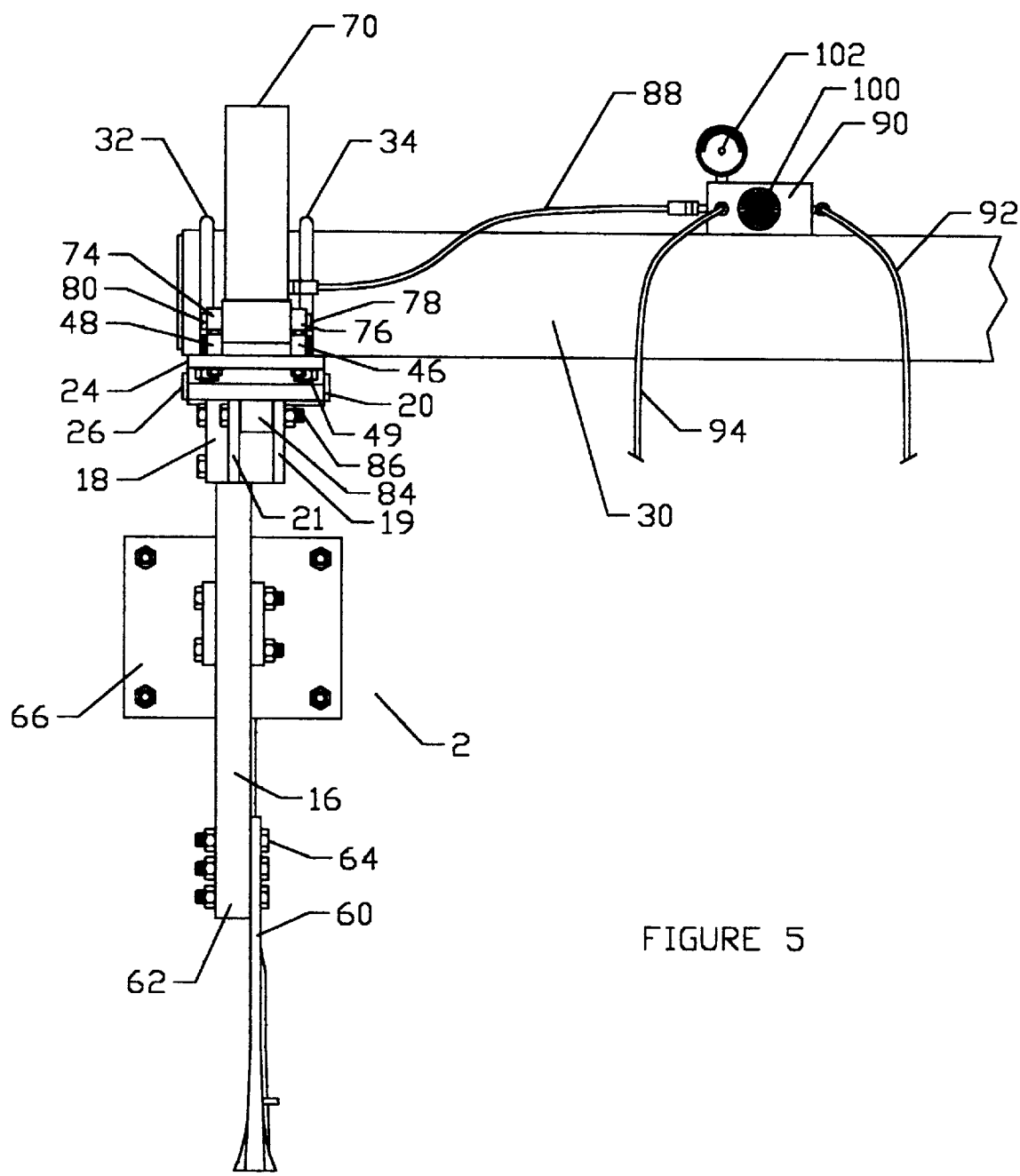
FIG. 5 is a right side plan view of the preferred embodiment of the invention.

Mounting plate 24 is mountable to the tool bar 30 by U-bolts 32, 34 which straddle tool bar 30 or by other means which allows invention 2 to be removably mounted to tool bar 30. U-bolts 32, 34 are received in holes 36 in mounting plate 24. Gusset plate 28 is welded or otherwise securely mounted to mounting plate 24 on the top surface 25 thereof and disposed such that front edge 40 of gusset plate 28 will abut the rear of tool bar 30 when invention 2 is mounted to tool bar 30 by U-bolts 32, 34. Gusset plate 28 is provided with angled edge 42 opposing its front edge 40, angled edge 42 being shaped to evenly abut stop pad 44 when invention 2 is displaced to its maximum deflected position, as best seen in FIG. 4. It is found that angled edge 42 may advantageously be formed at an angle of approximately 145° from the lower edge 43 of gusset plate 28.

Arm 18 comprises a pair of parallel, spaced apart bars 19, 21 which are mounted together by spacers including spacer 46. Stop pad 44 is securely mounted atop arm 18 along its length and rearward of first plate 20 such that when arm 18 rotates clockwise, stop pad 44 will come into abutment with angled edge 42 of gusset plate 28 when arm 18 has rotated approximately thirty-five degrees from horizontal.

It will be seen that arm 18 may be curvilinear having leading linear segment 50 and trailing linear segment 52 separated by angled segment 54 such that rear end 56 of arm 18 is offset laterally from forward end 22 of arm 18. The offset is preferably approximate equal to the thickness of the knife member 60 which may be mounted to shank 16 at its lower end 62.

Shank 16 is a solid, relatively rigid bar which is mounted at its upper end 58 between parallel bars 19, 21 of arm 18 such that shank 16 depends substantially perpendicularly from rear end 56 of arm 18. Because of the unique features of invention 2, shank 16 may be made rigid and yet will not be damaged when obstacles such as rocks in the soil are encountered by knife member 60. Additionally, the advantageous design of invention 2 allows knife member 60 to be mounted to shank 16 by use of increased strength mounting such as bolts 64. Because shear forces on bolts 64 are reduced by the structure of invention 2, fewer breakages of knife member 60 or bolts 64 are to be anticipated resulting in less down time and fewer repair costs.

Shank 16 is provided with accessory mounting plate 66 mounted at the rear side 68 thereof to provide means to receive a coupled accessory such as furrow closer 14 which may be bolted to accessory mounting plate 66 to provide a tillage implement which may be employed to open a furrow and allow injection of anhydrous ammonia fertilizer and immediately be followed by the apparatus to close the furrow. It is to be understood that invention 2 may be employed for various soil disrupting tools which operate by drawing a knife through soil while the tool is mounted to and drawn by a horizontal tool bar.

Mounted to and supported by mounting plate 24 is a vertically disposed working cylinder such as hydraulic cylinder 70 which is provided with a piston rod 72 which may be extended from cylinder 70. Cylinder 70 is retained by a trunnion mount to mounting plate 24 by bearings 74, 76 which receive diametrically opposing journals 78, 80 extending radially from cylinder 70. This mounting structure permits cylinder 70 to pivot relative to mounting plate 24 as rod 72 is drawn from cylinder 70. Bearings 74, 76 are supported on blocks 46, 48 which are fixed to mounting plate 24 by bolts 49.

Free end 82 of rod 72 is provided with a circular bearing 84 which receives a retention pin 86 which passes transversely through bars 19, 21 of arm 18 and through circular bearing 84 to retain free end 82 of rod 72 to arm 18.

Cylinder 70 is biased by use of pressured working fluid, which in the preferred embodiment is hydraulic fluid, such that extension of rod 72 from cylinder 70 is resisted until a predetermined working fluid pressure is exceeded due to extending force on rod 72. Fluid line 88 interconnects cylinder 70 with pressure reducing/relieving valve 90. Pressure reducing/relieving valve 90 is provided with control knob 102 and meter 100 and may be of the type available as HYDRAFORCE, INC. model PR 10-32. Pressure reducing/relieving valve 90 is coupled to the tractor hydraulic system by high pressure line 92 and discharge line 94 whereby high pressure line 92 couples the variable displacement pump 96 of tractor 8 and discharge line 94 couples pressure reducing/relieving valve 90 to the hydraulic fluid reservoir 98 of tractor 8.

As an alternative structure, cylinder 70 may be mounted in an inverted disposition from that shown in the drawing figures wherein cylinder 70 would be mounted below arm 18 and have piston rod 72 hingedly fixed at its free end 82 to mounting plate 24. In that alternate embodiment, rocking of cylinder 70 on its mounting as provided by journals 78, 80 in bearings 74, 76 would not be required.

It may be appreciated that hydraulic fluid 106 within cylinder 70 is maintained at a preselected pressure between 0–2500 psi as selected by proper adjustment of pressure reducing/relieving valve 90 which permits pressurized fluid 106 to enter cylinder 70 and resist downward displacement of piston 104 therewithin. When knife member 60 encounters a resistive obstacle such as a partially or fully buried rock, knife member 60 and shank 16 are forced rearwardly causing arm 18 to pivot about pin 26 and thereby to draw rod 72 from cylinder 70 when the force upon knife member 60 exceeds a preselected level. The level at which pressure reducing/relieving valve 90 permits fluid 106 to pass therethrough into discharge line 94 is chosen by adjustment of control knob 100 of pressure reducing/relieving valve 90 by observation of meter 102. It is found that in rocky soils, for a cylinder 70 with a two-inch bore, a relief pressure of approximately 750 psi will permit knife member 60 to displace before shear forces thereon damage knife member 60 or shear bolts 64. Fluid 106 forced from cylinder 70 passes through fluid line 88 through pressure reducing/relieving valve 90 to reservoir. As soon as the soil obstruction is bypassed, pressurized fluid delivered from the variable displacement pump 96 of tractor 8 through high pressure line 92 forces piston 104 upward thereby causing arm 18 to return to its ambient state with knife member 60 sunk in soil 12 and shank 16 in a substantially vertical position.

In the preferred embodiment, a hydraulic cylinder 70 having a two-inch bore and a six-inch stroke was used in order to provide nine inches of vertical travel of the lower end of knife member 60. Since the depth preferred for application of anhydrous $NH_3$ is six inches, when a rock is encountered, the knife point may move upward three inches above the soil surface if necessary before binding occurs. This is found to be satisfactory to reduce knife breakage to acceptable levels.

It should be understood that cylinders having other stroke lengths and bore sizes may be selected without departing from the scope of this invention. For instance, when used for a chisel plow, a vertical displacement of twelve to fifteen inches may be needed, leading to the need for a longer traveling piston rod 72. In addition, the force needed to retain a chisel plow at a soil depth of nine to twelve inches is greater than that needed to draw an anhydrous knife through soil at a six-inch depth. As a result, a larger bore cylinder may be chosen such that more force may be applied to retain arm 18 in a horizontal position without increasing the fluid pressure needed beyond that provided by the pump 96 of tractor 8, while not sacrificing the variability and control provided by pressure reducing/relieving valve 90.

The invention allows multiple hydraulic cylinders 70 to be connected in series to a single pressure reducing/relieving valve 90 and thus to control multiples of invention 2 by one adjustment of control knob 100 of pressure reducing/relieving valve 90. Frequently in application of anhydrous $NH_3$ a tool bar may be equipped with multiple applicator knives mounted side-by-side and used to place fertilizer at six inches below the soil surface. A user of the invention 2 may adjust the bias pressure of each hydraulic cylinder 70 in a series of invention 2 used in this application by a single valve adjustment.

Having described the invention, I claim:

1. Reset apparatus for a soil disrupting tillage device mounted to a horizontally disposed tool bar drawn over a soil surface, comprising an elongate shank disposed substantially vertically when said tillage device is in an operative mode, said shank having an upper end, a soil engaging narrow profile knife mounted to said shank and extending therebelow, an elongate arm mounted substantially perpendicularly to said shank adjacent the upper end thereof, said elongate arm having a forward segment and a rear segment, a horizontally disposed plate adaptable for mounting to said tool bar, said plate having a forward end and rear end, said elongate arm pivotably mounted along its length to the rear end of said plate, said elongate arm pivotable within a substantially vertical plane about said rear end of said plate, a hydraulic cylinder mounted to said plate near the forward end thereof, the hydraulic cylinder disposed axially vertically upon said plate, said hydraulic cylinder having a piston rod extensible therefrom, said hydraulic cylinder biased by working fluid means to resist extension of said piston rod therefrom, said piston rod fixed to said elongate arm adjacent the forward end thereof, a pressure reducing/relieving valve coupled to said hydraulic cylinder, said pressure reducing/relieving valve fluid-coupled to a source of hydraulic fluid under pressure.

2. The reset apparatus of claim 1 wherein said elongate arm has a plate member mounted to the top thereof along the forward segment thereof, said plate member of said elongate arm is disposed below said plate.

3. The reset apparatus of claim 1 wherein said elongate shank is rigid and substantially linear, said elongate arm having a forward end and a rear end, said rear end of said elongate arm mounted to said upper end of said shank, said rear segment of said elongate arm extending past said rear end of said plate, said forward segment of said elongate arm disposed below said plate.

4. The reset apparatus of claim 1 wherein a gusset member is fixed to the top of said plate, said gusset member disposed to abut said tool bar when said plate is mounted to said tool bar, said gusset member having a rear side which extends rearward past said rear end of said plate, said rear side having an inclined segment, said inclined segment abutting said elongate arm to limit pivot of said elongate arm about said rear end of said plate.

5. The reset apparatus of claim 1 wherein said hydraulic cylinder is pivotable on said plate in a forward and rearward direction, said rod is pivotally mounted to said elongate arm.

6. The reset apparatus of claim 1 wherein a plurality of said cylinders is coupled to said pressure reducing/relieving valve, each of said cylinders associated with a plate member, an elongate arm, a shank and a knife member.

7. The reset apparatus of claim 1 wherein said hydraulic cylinder is selectively biased at a pressure between 100 and 2500 p.s.i. by selective operation of said pressure reducing/relieving valve.

8. Soil tillage apparatus for mounting to a horizontal tool bar and having a soil engaging member, comprising a mounting member disposed substantially horizontally and adapted for mounting to said horizontal tool bar, said mounting member having a rear end and a forward end, a lever arm mounted along its length to said mounting member at the rear end thereof and pivotable about said rear end, said lever arm including a segment extending past the rear end of said mounting member, said lever arm having a rear end thereon, a shank depending from said lever arm along the segment thereof extending past said rear end of said mounting member, said shank having the soil engaging member mounted thereto, hydraulic ram means urging said lever arm toward said mounting member, selectively variable valve means to control movement of said hydraulic ram means.

9. The soil tillage apparatus of claim 8 wherein said hydraulic ram means comprises a hydraulic ram having a cylinder and a rod extensible from said cylinder, one of said cylinder and said rod pivotably mounted to said mounting member, the other of said cylinder and said rod pivotably mounted to said lever arm, said rod extending from said cylinder when said lever arm pivots away from said mounting member, said hydraulic ram biased by pressurized hydraulic fluid to resist extension of said rod from said cylinder.

10. The soil tillage apparatus of claim 8 wherein said shank depends from the rear end of said lever arm.

11. The soil tillage apparatus of claim 8 wherein said cylinder is vertically disposed when said soil tillage apparatus is at rest, said cylinder having a base end and an opposing rod end, said rod end of said hydraulic cylinder pivotably mounted to said mounting member adjacent the forward end thereof, said rod having a free end, the free end of said rod retained to said lever arm.

12. The soil tillage apparatus of claim 8 wherein said cylinder is vertically disposed when said soil tillage apparatus is at rest, said cylinder having a base end and an opposing rod end, said lever arm having a forward end disposed below said mounting member, said rod end of said hydraulic cylinder mounted to said lever arm adjacent the forward end thereof, said rod having a free end, the free end of said rod retained to said mounting member.

13. The soil tillage apparatus of claim 8 wherein said mounting member is a top plate disposed in a substantially horizontal plane, said mounting member disposed below said tool bar, said lever arm is provided with a horizontal plate on the top thereof, said horizontal plate disposed below said mounting member.

14. The soil tillage apparatus of claim 8 wherein a gusset plate is disposed upon said mounting member and aligned substantially vertically, said gusset plate having a rear edge, said rear edge inclined from horizontal, a stop pad mounted upon said lever arm along the segment thereof extending past said rear end of said mounting member, said stop pad abuttingly engaging said rear edge of said gusset plate as said lever arm pivots on said mounting member.

15. In a tillage implement having a soil engaging member of narrow profile and being adjusted for selective mounting to a tool bar drawn by a tractor, the tractor having a primary hydraulic system including a variable displacement pump and a hydraulic fluid reservoir and having a high pressure line coupled to said pump and a discharge line coupled to said reservoir, the improvement comprising a first plate adapted for mounting below said tool bar, an elongate lever arm pivotally mounted to said first plate, said lever arm having a first end and a second end, said first plate having a first end and a second end, said lever arm pivotally mounted along its length to said second end of said plate, said lever arm having a shank depending from the second end thereof, a hydraulic ram mounted to said first plate near the first end thereof, said hydraulic ram having a rod extendible therefrom, said rod fixed to said lever arm near the first end thereof, said hydraulic ram coupled to a pressure reducing/relieving valve, said pressure reducing/relieving valve coupled to said high pressure line and said discharge line, said hydraulic ram biased by hydraulic fluid pressure to resist extension of said rod therefrom, said pressure reducing/relieving valve selectively adjustable to a level of hydraulic fluid pressure to be applied to said hydraulic ram.

* * * * *